United States Patent [19]

McKaveney

[11] 4,002,481
[45] Jan. 11, 1977

[54] COMPOSITION FOR CORROSION PROTECTION USING METAL SILICIDES OR ALLOYS OF SILICON AND METALS

[75] Inventor: James P. McKaveney, Claremont, Calif.

[73] Assignee: Hooker Chemicals & Plastics Corporation, Niagara Falls, N.Y.

[22] Filed: Apr. 9, 1975

[21] Appl. No.: 566,483

[52] U.S. Cl. .................................. 106/14; 252/387; 252/389 R; 21/2.7 R

[51] Int. Cl.² .................. C09K 3/00; C23F 11/00; C09D 5/08

[58] Field of Search ....................... 252/387, 389 R; 21/2.7 R; 106/14

[56] References Cited

UNITED STATES PATENTS

| | | | |
|---|---|---|---|
| 3,457,103 | 7/1969 | Keller et al. | 252/387 |
| 3,615,730 | 10/1971 | Law et al. | 252/387 |
| 3,796,582 | 3/1974 | Leahey et al. | 106/14 |

FOREIGN PATENTS OR APPLICATIONS 784,448  7/1935  France

*Primary Examiner*—Benjamin R. Padgett
*Assistant Examiner*—David Leland
*Attorney, Agent, or Firm*—Peter F. Casella; William J. Crossetta, Jr.

[57] ABSTRACT

A composition suitable for the protection of corrodible metallic surfaces which comprises a binder and a filler, the filler being present in an amount sufficient to impart corrosion resistant characteristics to the composition, the filler selected from the group consisting of silicides of active metals which are unstable when introduced alone into water and alloys of silicon and active metals which are unstable when introduced alone into water.

24 Claims, No Drawings

COMPOSITION FOR CORROSION PROTECTION USING METAL SILICIDES OR ALLOYS OF SILICON AND METALS

This invention relates to an improved composition for providing corrosion resistance for corrodible metallic surfaces.

Various compositions have been proposed in the prior art to provide varying measures of protection against corrosion of corrodible metallic surfaces. In more recent years, attention has been progressively given over to providing compositions and systems for providing cathodic-anodic corrosion protection for metallic surfaces of structural elements. Such structures as underground pipes, storage tanks, buildings and the like, as well as metallic structures continually in contact with water, such as ships, support structures for drilling rigs, docks and the like have been treated with or coated with a variety of compositions or systems to impart varying degrees of corrosion resistance thereto.

Generally, such systems or compositions as have been employed utilize either an external source of electrical current which serves to maintain as cathodic the surface to be protected or the corrosion protection composition itself forms an internal battery with the metallic surface to be protected. In the latter systems, the coatings contain metallic particles which are more anodic in nature than the metallic surface to be protected, and thus serve to function as sacrificial anodes. Most commonly, in coatings of this latter type, the composition is comprised primarily of a binder and a filler. The binder may be any suitable organic or inorganic binder material and the filler is constituted by conductive metallic particles which are more anodic than the metallic surface to be protected against corrosion. Most generally, the metallic particles utilized in such coating compositions are zinc particles.

It is known that such zinc-rich coating compositions serve to protect against harmful corrosion of corrodible metal surfaces to a greater degree than do ordinary paints, particularly when applied to iron and steel surfaces. Such zinc-rich coating compositions are extremely effective in salt-air atmospheres and in applications where the coated metal surface contacts brine solutions. Zinc powder has for some time been recognized as having a specific use as a pigment in the antifouling and anti-corrosive ship bottom paints. For such applications, it is necessary to produce coating compositions comprised of a finely divided zinc powder suspended in a heavy-bodied drying oil, a spar varnish or lacquer. Extreme fineness has been a chief requisite for successful application in this area.

Zinc-rich coating compositions are compounded in such a manner to provide a subsequent dry film containing 85 to 95 percent zinc dust, with no zinc oxide. The coatings are rich in metallic zinc which is intimate contact with the iron or steel surface to be protected, and provides sacrificial electro-chemical or cathodic protection to the base metal, such as occurs on galvanized products. Also, as in galvanizing, the zinc-rich coating film is electrically conductive. This dual property of direct metal to metallic zinc contact and good electrical conductivity of the dry film distinguishes zinc-rich coatings from other corrosion-inhibitive coating compositions. The coating composition is formulated with the zinc dust in suitable vehicles, such as for example, plasticized polystyrene, chlorinated rubber and some inorganic materials. Such vehicles must have sufficient strength to carry the high metallic particle concentration involved, and yet provide adherence and flexibility.

While such protective coating compositions have been used to an appreciable extent, the metal particles, such as zinc powder or dust, add greatly to the cost of such compositions. In addition to the cost factor, it is frequently necessary to utilize appreciable quantities of this relatively expensive metallic filler, on the order of 80 percent or more of the weight of the total composition in order to provide the requisite corrosion protection of the metallic surface.

Attempts have been made to reduce the requirements for zinc metal in such zinc-rich coating compositions, as for example, by replacing a portion of the metallic zinc particle filler material with such as inert refractory alloys, such coating compositions being disclosed in U.S. Pat. No. 3,562,124, which are electrically conductive, brittle and substantially non-reactive in water. Such compositions as are disclosed contain generally from 25 to 50 percent of the inert refractory ferroalloy and 50 to 75 percent zinc powder or dust, based on the total weight of filler present in the coating composition. While such compositions serve to impart corrosion resistance, such compositions still require the presence and use of considerable percentages of zinc powder or dust. Further, zinc is in large measure imported into the United States and it is desirable to replace it with more commonly available metals such as calcium or magnesium or alloys of the same. In addition, metals such as calcium or magnesium are more environmentally acceptable than zinc in water systems.

It is an object of the present invention to provide a corrosion protective composition for corrodible metal surfaces, which composition provides corrosion protection at least equivalent to that provided by present zinc-rich coating compositions.

A further object of the present invention is to provide an improved corrosion protective composition for corrodible metallic surfaces, which composition is less expensive than the presently employed zinc-rich coating compositions.

These and other objects of the present invention will become apparent to those skilled in the art from the detailed description of the invention which follows:

Pursuant to the above objects, the present invention provides for a composition suitable for the protection of corrodible metallic surfaces which comprises a binder and a filler, the filler being present in amounts sufficient to impart corrosion-resistant characteristics to the composition and being constituted of alloys of silicon and active metals which are unstable when introduced alone into water, and/or silicides of active metals which are unstable when introduced alone into water.

By "active metal" it is intended to encompass those metals which are above manganese in the electromotive series (+1.03 volts electrode oxidation potential versus the standard hydrogen electrode) and normally corrode heavily in aqueous systems or in acid solutions unless protected. Highly active metals suitable for forming the alloys used in the compositions include calcium, barium, magnesium, aluminum, lithium, cerium, titanium, lanthanum, manganese and the like. Preferably, the active metals are selected from the group consisting of calcium, magnesium and aluminum.

With this composition, the corrosion resistance afforded corrodible metallic surfaces approximates that afforded by zinc-rich coating compositions and imparts desirable properties to corrosion-inhibiting compositions not obtained by the use of zinc powder or dust. For example, the silicon tends to give desirable body to the coating composition, and any oxidation of the alloy or silicide tending to produce silicates, which functions as a binder in the coating composition producing a greatly resistant finish.

Suitable alloys and silicides for use in the protective coating compositions of the present invention include steel making alloys prepared by the ferroalloy industry and known in the trade as calcium-silicon ($CaSi_2$), calsibar (CaSiBa), magnesium ferrosilicon (MgFeSi), hypercal (AlBaCaFeSi), silicomanganese (MnFeSi), and magnesium silicide ($Mg_2Si$).

More specifically, in the practice of the present invention, the composition for protecting corrodible metallic surfaces contains the binder in an amount preferably within the range of from about 3 to about 70 percent by weight of the composition, and preferably in an amount which is within the range of from about 3 to about 50 percent by weight of the composition.

Various binder materials, both organic and inorganic, the choice of the particular binder being dependent upon the characteristics which are desired for the protective coating composition in each particular instance. The binder, for example, may be selected from such organics as epoxy resins, chlorinated rubber, polystyrene, polyvinyl butyral resins, polyvinyl acetate resins, silicones, alkyd and phenolic resins or the like. Additionally, such inorganic binders as those obtained from silicates, such as the alkali metal silicates including sodium silicates; phosphates; hydrolyzed ethyl silicates, butyl titanates; and the like may be employed. It is believed that the use of these and other similar binder materials will be apparent to those skilled in the art so that the particular binder suitable in each instance can be selected for use in the composition of the present invention.

Mixtures of the alloys and silicides set forth hereinabove may be employed with equally advantageous results.

The alloys and silicides employed in the anti-corrosive compositions of the present invention are conveniently prepared by any suitable method known to the art, as for example, by carbon reduction of the active metal oxide such as lime (CaO) with silica ($SiO_2$) in the submerged-arc electric furnace typical of the ferroalloy industry.

The alloys and/or silicides are dispersed in the selected binder in finely divided form. Desirably, the alloys and/or silicides have an average size within the range of from about 2 to about 10 microns, preferably within the range of from about 5 to about 7 microns. The alloys and/or silicides may be conveniently comminuted by any suitable crushing or grinding operation preferably in a carbon dioxide atmosphere to minimize any dust explosion hazard from the active alloy surface.

The coating composition of the present invention may be formulated by admixing the binder and alloy or silicide, using any suitable mixing techniques.

Depending upon the particular binder used, the composition may also contain suitable solvents, curing agents, plasticizers, and the like. Exemplary of suitable solvents or mineral spirits, methanol, ethanol, butanol, isopropanol, ethyl butyl ketone, xylene, toluene, methyl-isopropylketone, ethylene glycol monobutyl ether, ethylene glycol monoethyl ether, ethylene glycol monoethyl ether acetate, ethyl acetate, butyl acetate and the like.

Exemplary of suitable curing agents are cobalt, lead, manganese, driers such as naphthanates, polyamines such as triethylene-tetramine, polyamide resins such as those prepared from a fatty dibasic acid and ethyleney diamine, phosphoric acid, oxalic acid and the like.

Generally, the solvents may be present in amounts within the range of from about 5 to about 60 percent by weight of the composition while the curing agents and plasticizers may each be present in amounts up to about 70 percent by weight of the composition respectively.

It is to be appreciated, of course, that the specific amounts of these components, as well as the types used, will depend in each instance upon the particular binder as well as the ultimate characteristics desired for the particular coating composition and use.

Though thus-formulated composition may then be applied to the metal surface to be protected using any suitable technique, as for example, by spraying, brushing, immersion, flowing or the like. Generally, the coatings are applied to produce a resultant coating or film having a thickness of from about 1.0 to about 15 mils, preferably from about 8 to about 12 mils. Generally, this film comprises the binder in an amount of from about 3 to about 70 percent by weight, preferably from about 7 to about 50 percent by weight, with the alloy and/or silicide present in an amount of from about 30 to about 97 percent by weight, preferably from about 50 to about 93 percent by weight.

Following the application of the protective coating composition to the metal surface to be protected, drying and/or curing of the coating is effected. The particular type and extent of the drying and/or curing will necessarily vary in each particular instance, depending upon the specific nature of the binder material which is used in the composition. Therefore, in some instances, heating may be utilized to effect drying or curing of the protective coating, while in other instances, air drying or curing may prove sufficient.

The thus-formed protective coatings are found to provide a high degree of protection against corrosion to the corrodible metal substrates to which they are applied, including substrates of ferrous metal, copper and the like. Depending upon the particular metallic surface to be protected, the alloy and/or silicide employed in the coating composition is changed so as to utilize alloys and/or silicides which are sufficiently more anodic than the metallic surface so as to provide the desired degree of protection. In this regard, it is to be noted that the protective coatings of the present invention act anodically to provide the necessary protection against corrosion for the metallic surfaces to which they are applied. Thus, the coatings of the present invention are found to provide excellent corrosion protection of the anodic type of numerous metal surfaces in contact with corrosive media such as underground pipelines, ships hulls, offshore drilling platforms, and the like.

In order that those skilled in the art may better understand the present invention and the manner in which it may be practiced, the following examples of alloy electrochemical potentials compared with zinc are presented by way of illustration. It is to be appreciated, however, that these examples are merely illustrative of the present invention and are not to be taken as a limitation thereof.

Graphite-rods with active alloy powder in an organic binder were prepared as electrodes by painting them to a height of three inches with conducting silver epoxy paste. Then the electrode was rolled over a layer of alloy powder placed on a sheet of paper. When the powder entirely covered the epoxy paint coating, excess powder was allowed to fall back onto the paper. The electrode was then attached to a clamp at the graphite end of the electrode. The electrode and clamp were then placed in a drying oven at 160° C for 15 hours (overnight) to cure the epoxy.

After removal of the dried electrode and cooling, it was placed in a 1:10 hydrochloric acid solution for a light pickle to remove surface oxide films. The more active alloy electrodes ($CaSi_2$, CaSiBa, $Mg_2Si$, MgFeSi) were only given about a 10 second immersion because of high reactivity. The $Mg_2Si$ electrode actually produced a light sparking because of silane generation and ignition. The less active alloy electrodes were pickled from 30 seconds to 2.0 minutes to remove visible oxide. A small amount of excess alloy powder was observed falling from some electrodes.

Following the acid pickle, the electrodes were immediately given a water rinse to remove excess acid. While still wet with water, the electrode was attached to a copper wire at the graphite end and the alloy end placed in the test electrolyte. The opposite end of the copper wire was attached to a Beckman terminal connector (Part No. 700) which was inserted in the connection normally used for the glass electrode of the pH meter. The potential measurement using the model G pH meter in the millivolt mode was essentially that advanced by Hampel. Potentials in various electrolytes were made with reference to the saturated calomel electrode (S.C.E.) which equals +0.245 volts at 25° C and are shown in Table I.

TABLE I

| Alloy | Potentials vs S.C.E. for Zinc Compared with Silicon Alloys Electrolyte | | | |
|---|---|---|---|---|
| | 0.10N $CaCl_2$ | 0.10N Mg $So_4$ | 0.10N $NH_4Cl$ | 3% NaCl |
| $CaSi_2$ | −1.35 | −1.20 | −1.40 | −1.30 |
| CaSiBa | −0.65 | −0.68 | −0.63 | −0.75 |
| $Mg_2Si$ | −1.25 | −1.15 | −1.21 | −1.01 |
| MgFeSi (8.9 Mg) | −0.89 | −1.07 | −1.12 | −0.88 |
| AlBaCaFeSi | −0.65 | −0.69 | −0.79 | −0.74 |
| 66 MnFeSi | −0.81 | −0.63 | −0.40 | −0.79 |
| 50 AlSi | −0.64 | −0.61 | −0.66 | −0.73 |
| Zn | −0.98 | −0.99 | −1.07 | −1.07 |
| Fe | −0.69 | −0.65 | −0.62 | −0.71 |

TABLE II

| Alloy* | Alloy Compositions Analysis |
|---|---|
| $CaSi_2$ | 32.4 Ca, 0.4 Ba, 4.1 Fe, 63.1 Si |
| CaSiBa | 16.6 Ca, 16.7 Ba, 8.5 Fe, 57.0 Si |
| $Mg_2Si$ | 63.0 Mg, 36.8 Si |
| 9 MgFeSi | 8.9 Mg, 46.0 Fe, 45.2 Si |
| 5 MgFeSi | 5.7 Mg, 44.5 Fe, 0.7 Mn, 0.6 Ce, 1.0 Ca, 45.7 Si |
| AlBaCaFeSi | 20.5 Al, 12.4 Ba, 10.6 Ca, 17.5 Fe, 39.0 Si |
| AlSi | 49.0 Al, 50.0 Si |
| 66 MnFeSi | 66.3 Mn, 1.3 C, 13.0 Fe, 19.2 Si |
| Zn (Reference) | 99.8 Zn |
| Fe (Reference) | 99.7 Fe |
| Other possible alloys available commercially but not tested are: | |
| CaMnSi | 16–20 Ca, 14–18 Mn, 54–59 Si, balance iron |
| CeLaSi | 2–30 Rare Earths (Ce, La, Pr, Nd), 35–55 Si and balance iron |
| $MgSi_2$ | 30–32 Mg, 50–55 Si, 4–5 Ca, 1.0 Rare Earths, 7–15 iron |
| BaSi | 40–50 Ba, 40–55 Si, 1–20 Fe |
| FeMn | 80–85 Mn, 1.0–8.0 Si, 6–19 Fe, 0.5–1.5 C (this is a grade of ferromanganese) |

*The alloys also contain minor amounts of other elements (C, P, S, Ni, Cr, V, N, O, etc.) and chemical symbols do not always represent stoichiometric ratios as most are made to optimum metallurgical and cost specifications.

What is claimed is:

1. A composition suitable for the anodic protection of corrodible metallic surfaces which comprises a binder and a filler, the filler being present in an amount sufficient to impart corrosion resistant characteristics to the composition and selected from the group consisting of:
   a. alloys of silicon and barium, calcium, magnesium, lithium, cerium, titanium, lanthanum, manganese and mixtures thereof,
   b. silicides of barium, calcium, magnesium, lithium, cerium, titanium, lanthanum, manganese and mixtures thereof, and
   c. mixtures of (a) and (b).

2. The composition of claim 1 wherein the binder constitutes from about 3 to about 70 percent by weight of the composition and the filler is present in an amount of from about 20 to about 95 percent by weight of the composition.

3. The composition of claim 1 wherein the filler has an average particle size of from about 1 to about 10 microns.

4. The composition of claim 1 wherein the filler is an alloy of silicon and an active metal selected from the group consisting of barium, calcium, magnesium, lithium, cerium, titanium, lanthanum and manganese, and mixtures thereof.

5. The composition of claim 4 wherein the active metal is calcium or magnesium.

6. The composition of claim 4 wherein the silicon alloy contains from about 5.0 to about 85 percent by weight of the active metal alone or in combination with other active metals.

7. The composition of claim 1 wherein the filler is a silicide of an active metal selected from the group consisting of barium, calcium, magnesium, lithium, cerium, titanium, lanthanum and manganese, and mixtures thereof.

8. The composition of claim 7 wherein the silicide is calcium or magnesium silicide.

9. A method of forming a corrosion protective coating on a metallic surface which comprises contacting the surface with the composition of claim 1 and forming a coating of said composition on the surface thus-contacted.

10. A method of forming a corrosion protective coating on a metallic surface which comprises contacting the surface with the composition of claim 2 and forming a coating of said composition on the surface thus-contacted.

11. A method of forming a corrosion protective coating on a metallic surface which comprises contacting the surface with the composition of claim 3 and forming a coating of said composition on the surface thus-contacted.

12. A method of forming a corrosion protective coating on a metallic surface which comprises contacting the surface with the composition of claim 4 and forming a coating of said composition on the surface thus-contacted.

13. A method of forming a corrosion protective coating on a metallic surface which comprises contacting the surface with the composition of claim 5 and forming a coating of said composition on the surface thus-contacted.

14. A method of forming a corrosion protective coating on a metallic surface which comprises contacting the surface with the composition of claim 6 and forming a coating of said composition on the surface thus-contacted.

15. A method of forming a corrosion protective coating on a metallic surface which comprises contacting the surface with the composition of claim 7 and forming a coating of said composition on the surface thus-contacted.

16. A method of forming a corrosion protective coating on a metallic surface which comprises contacting the surface with the composition of claim 8 and forming a coating of said composition on the surface thus-contacted.

17. An article having a metallic surface coated with a coating of the composition as claimed in claim 1.

18. An article having a metallic surface coated with a coating of the composition as claimed in claim 2.

19. An article having a metallic surface coated with a coating of the composition as claimed in claim 3.

20. An article having a metallic surface coated with a coating of the composition as claimed in claim 4.

21. An article having a metallic surface coated with a coating of the composition as claimed in claim 5.

22. An article having a metallic surface coated with a coating of the composition as claimed in claim 6.

23. An article having a metallic surface coated with a coating of the composition as claimed in claim 7.

24. An article having a metallic surface coated with a coating of the composition as claimed in claim 8.

* * * * *